(12) United States Patent
Okamoto et al.

(10) Patent No.: US 7,596,937 B2
(45) Date of Patent: Oct. 6, 2009

(54) RUBBER PRODUCT-REINFORCING METALLIC CORD AND METHOD FOR MANUFACTURING SUCH A CORD

(75) Inventors: Kenichi Okamoto, Hyogo (JP); Yasuo Sakai, Tochigi (JP); Kazuhiko Saito, Tochigi (JP)

(73) Assignees: Sumitomo (SEI) Steel Wire Corp., Hyogo (JP); Sumitomo Electric Tochigi Co., Ltd., Tochigi (JP)

( * ) Notice: Subject to any disclaimer, the term of this patent is extended or adjusted under 35 U.S.C. 154(b) by 0 days.

(21) Appl. No.: 11/547,717

(22) PCT Filed: Apr. 7, 2005

(86) PCT No.: PCT/JP2005/006855

§ 371 (c)(1),
(2), (4) Date: Feb. 12, 2008

(87) PCT Pub. No.: WO2005/098126

PCT Pub. Date: Oct. 20, 2005

(65) Prior Publication Data

US 2008/0223015 A1   Sep. 18, 2008

(30) Foreign Application Priority Data

Apr. 8, 2004   (JP) .............................. 2004-113896
Apr. 8, 2004   (JP) .............................. 2004-114112
Mar. 9, 2005   (JP) .............................. 2005-065823

(51) Int. Cl.
  *D02G 3/22*   (2006.01)
  *D02G 3/48*   (2006.01)

(52) U.S. Cl. .............................. 57/210; 57/212; 57/237

(58) Field of Classification Search .................. 57/210, 57/212, 237
See application file for complete search history.

(56) References Cited

U.S. PATENT DOCUMENTS

| 4,523,425 A | 6/1985 | Schild et al. |
| 4,947,638 A * | 8/1990 | Nagamine et al. .............. 57/212 |
| 5,605,036 A * | 2/1997 | Onuma et al. .................. 57/212 |

(Continued)

FOREIGN PATENT DOCUMENTS

EP   0 344 568 A   12/1989

(Continued)

OTHER PUBLICATIONS

Supplementary European Search Report issued in European Patent Application No. EP 05728756.7, dated Jun. 25, 2009.

*Primary Examiner*—Shaun R Hurley
(74) *Attorney, Agent, or Firm*—McDermott Will & Emery LLP

(57) ABSTRACT

A rubber product-reinforcing metallic cord is provided which comprises three to five metallic filaments, which shows a high degree of penetration of rubber without reducing compressive rigidity, and which can be manufactured at low facility and production costs. A rubber product-reinforcing metallic cord 7 is formed by twisting together a pre-strand 6 comprising a first metallic filament 1 and a second metallic filament 2 helically wrapped around the first filament 1, and a fifth metallic filament 3 (or 5) with a twist pitch P. The metallic cord 7 may be formed by twisting together two of such pre-strands, or by twisting together two of such pre-strands and the fifth metallic filament.

16 Claims, 8 Drawing Sheets

U.S. PATENT DOCUMENTS 5,737,909 A * 4/1998 Macklin et al. ............... 57/218
6,817,395 B2 * 11/2004 Sinopoli et al. ............. 152/527

FOREIGN PATENT DOCUMENTS

| | | |
|---|---|---|
| JP | 60-10151 | 3/1985 |
| JP | 61-1554 | 1/1986 |
| JP | 01-162885 | 6/1989 |
| JP | 01-207486 | 8/1989 |
| JP | 02-014084 | 1/1990 |
| JP | 02-014085 | 1/1990 |
| JP | 03-033286 | 2/1991 |
| JP | 3-23673 | 3/1991 |
| JP | 05-272081 | 10/1993 |
| JP | 06-049789 | 2/1994 |
| JP | 06-073672 | 3/1994 |
| JP | 7-24996 | 5/1995 |
| JP | 7-126992 | 5/1995 |
| JP | 08-127984 | 5/1996 |
| JP | 10-096181 | 4/1998 |
| JP | 3174803 | 3/2001 |
| JP | 2001-301415 | 10/2001 |

* cited by examiner

RUBBER PRODUCT-REINFORCING METALLIC CORD AND METHOD FOR MANUFACTURING SUCH A CORD

RELATED APPLICATION

This application is a national phase of PCT/JP2005/006855 filed on Apr. 7, 2005, which claims priority from Japanese Application Nos. JP 2004-113896, JP 2004-114112, and JP 2005-065823 filed on Apr. 8, 2004, Apr. 8, 2004, and Mar. 9, 2005, respectively, the disclosures of which Applications are incorporated by reference herein. The benefit of the filing and priority dates of the International and Japanese Applications is respectfully requested.

TECHNICAL FIELD

The present invention relates to an inexpensive metallic cord for reinforcing rubber products that allows smooth penetration of rubber into the cord while maintaining high compressive rigidity, and a method for manufacturing such a cord.

BACKGROUND ART

Two major requirements for reinforcing metallic cords used in vehicle tires are a high degree of penetration of rubber and high compressive rigidity, the latter having an influence on the cornering performance of the vehicle. But in today's such reinforcing metallic cords, the above two requirements tend to conflict each other. For example, while a steel cord disclosed in Patent publication 1, of which the element wires have corrugations formed with a pitch smaller than their twist pitch, are high in the degree of penetration of rubber, such a cord is lower in compressive rigidity than a metallic cord of which the element wires have no such corrugations (which is called a compact cord). This is because even if the corrugations are formed with a small pitch and/or are two-dimensional corrugations, when element wires are twisted into the cord, three-dimensional large waves having a pith equal to the twist pitch are formed, so that the bellies of the bent portions of the wires face radially outwardly at intervals equal to the twist pitch. These portions are less resistant to compressive loads, thus lowering the compressive rigidity of the cord. If the corrugations of the element wires are large in height before the wires are twisted together, the compressive rigidity of the cord tends to be low over its entire length, irrespective of whether the bellies of the element wires are facing radially inwardly or outwardly.

Patent publications 3 to 5 teach the concept of improving the degree of penetration of rubber and thus its corrosion resistance without corrugating element wires before twisting the wires together. But for this purpose, it is necessary to twist only one of the strands of element wires before twisting the strands together. This increases the facility cost and manufacturing cost. Since the cord of Patent document 2 is a cord with an open construction, it shows high elongation under low loads. This may cause adjacent cords to contact each other when they are set in rubber to reinforce the rubber, because they have a tendency to curl and are unstable.

In order to increase the twist rate, the steel cord of Patent document 1 comprises a first sub-strand of two-parallel element wires each formed with fine two- or three-dimensional corrugations and bound together so as to extend substantially parallel to each other, and a second strand formed by twisting two element wires together, wherein the first sub-strand and the second strand are twisted together with a pitch greater than the pitch with which the element wires of the first sub-strand are corrugated.

The steel cord of Patent document 2 comprises two strands each comprising two or three element wires or sub-strands that are arranged in parallel to each other while being in contact with each other, and twisted together so as to be substantially parallel to each other while maintaining gaps of 8 to 30% of the diameter of the element wires or sub-strands therebetween.

The steel cord of Patent document 3 is formed by twisting a strand of two linear members and two parallel linear members together to improve the degree of penetration of rubber into the cord, while maintaining high elasticity.

The steel cord of Patent document 4 comprises a first group of two element wires and a second group of three element wires, all extending parallel to the axis of the cord. Any two cross-sections of the cord separated longitudinally by a distance of a half pitch are substantially in the shape of an umbrella and an inverted umbrella.

The steel cord of Patent document 5 is formed by helically wrapping a second strand of three wires around a first strand of two wires having a twist pitch of 50 mm such that the second strand has a smaller twist pitch than the first strand, and a gap of 10% or over is formed between the first and second strands in every twist pitch of the first strand.

[Patent document 1] JP patent publication 06-73672
[Patent document 2] JP patent publication 60-10151
[Patent document 3] JP patent publication 61-01554
[Patent document 4] JP patent publication 03-23673
[Patent document 5] JP patent 3174803

DISCLOSURE OF THE INVENTION

Problems to Which the Invention Provides Solution

An object of this invention is to provide a rubber product-reinforcing metallic cord which shows high penetration of rubber while maintaining high compressive rigidity, and which can be manufactured at lower facility and production costs, and a method of manufacturing such a cord.

Means to Solve the Problems

According to this invention, there is provided a rubber product-reinforcing metallic cord comprising a first pre-strand and a fifth metallic filament, the first pre-strand and a second pre-strand, or the first and second pre-strands and the fifth metallic filament, the first pre-strand comprising a first metallic filament and a second metallic filament helically wrapped around the first metallic filament, the second pre-strand comprising a third metallic filament and a fourth metallic filament helically wrapped around the third metallic filament, the first pre-strand and the fifth metallic filament, the first and second pre-strands, or the first and second pre-strands and the fifth metallic filament being twisted together with a twist pitch P.

Preferably, the rubber product-reinforcing metallic cord has the following characteristics.

(1) At least one of the second and fourth metallic filaments is wrapped around the corresponding one of the first and third metallic filaments in the same direction as the cord is twisted.

(2) At least one of the second and fourth metallic filaments is wrapped around the corresponding one of the first and third metallic filaments with a pitch $p_1$ which satisfies, with respect to the twist pitch P of the cord, the relation $0.922 \leq p_i/P \leq 0.991$.

(3) If the cord comprises the first and second pre-strands, the second and fourth metallic filaments are wrapped around the first and third metallic filaments with pitches $p_1$ and $p_2$, respectively, which satisfy, with respect to the twist pitch P of the cord, the relations $0.922 \leq p_1/P \leq 0.991$ and $0.922 \leq p_2/P \leq 0.991$.

(4) The cord is twisted with a twist angle α in a range of 3.5 to 7.3 degrees. The twist angle α of the cord is determined using a method shown in FIG. 8 of "Wire Rope Handbook" (issued Oct. 15, 1967 by Hakua Shobo, page 154). In this method, after forming the metallic cord, its diameter (layer core diameter), and twist pitch are measured, and the twist angle α is calculated from the equation $$\tan \alpha = \pi d's/P$$

where α is the twist angle (degrees), d's is the layer core diameter, and P is the twist length.

The present invention provides the following three specific rubber product-reinforcing metallic cords.

(I) A rubber product-reinforcing metallic cord comprising a first pre-strand comprising a first metallic filament and a second metallic filament helically wrapped around the first metallic filament, and a fifth metallic filament, the first pre-strand and the fifth metallic filament being twisted together with a twist pitch P (first embodiment).

(II) A rubber product-reinforcing metallic cord comprising a first pre-strand comprising a first metallic filament and a second metallic filament helically wrapped around the first metallic filament, and a second pre-strand comprising a third metallic filament and a fourth metallic filament helically wrapped around the third metallic filament, the first and second pre-strands being twisted together with a pitch P (second embodiment).

(III) A rubber product-reinforcing metallic cord comprising a first pre-strand comprising a first metallic filament and a second metallic filament helically wrapped around the first metallic filament, a second pre-strand comprising a third metallic filament and a fourth metallic filament helically wrapped around the third metallic filament, and a fifth metallic filament, the first and second pre-strands and the fifth metallic filament being twisted together with a pitch P (third embodiment).

The rubber product-reinforcing metallic cord of the first embodiment, which is formed of three metallic filaments, is manufactured by passing the first metallic filament through the center of a pass line, helically wrapping the second metallic filament around the first metallic filament with a first flyer to form the first pre-strand, introducing the first pre-strand and the fifth metallic element into a twister, and twisting the first pre-strand and the fifth metallic filament together with a pitch P.

The rubber product-reinforcing metallic cord of the second or third embodiment, which is formed of four or five metallic filaments, is manufactured by passing the first and third metallic filaments through the centers of pass lines, helically wrapping the second and fourth metallic filaments around the first and third metallic filaments with first and second flyers to form the first and second pre-strands, respectively, introducing the first and second pre-strands and/or the fifth metallic filament into a twister, and twisting the first and second pre-strands and/or the fifth metallic element together with a pitch P.

In these methods, the second and/or fourth metallic filament is preferably supplied from a driven wheel, the second and/or fourth flyer is driven by a driving source so as to twist the second and/or fourth metallic filament once per rotation of the first and/or second flyer so that the second and/or fourth metallic filament is wrapped around the first and/or third metallic filament with a constant pitch.

Preferably, the first and/or third metallic filament, which is passed through the center of the pass line, is supplied from a reel driven by a driving source.

ADVANTAGES OF THE INVENTION

The metallic cord according to this invention comprises the abovementioned first pre-strand, and the second pre-strand and/or the fifth metallic filament. The second and/or fourth filament, which is helically wrapped around the first and/or third filament, serves as a spacer that ensures the formation of gaps between the metallic filaments into which rubber can penetrate without the need to corrugate any metallic filament. Thus, rubber can smoothly and sufficiently penetrate into the cord according to the invention. Still, the cord of the invention maintains high compressive rigidity.

The second and/or fourth metallic filament can be helically wrapped around the first and/or third metallic filament with a simple filament supply unit and a flyer. Only one twister is needed. The cord according to the present invention can thus be manufactured at low facility and production costs.

By wrapping the second and/or fourth metallic filament around the first and/or third metallic filament in the same direction as the cord is twisted, the number of turns of the second and/or fourth metallic filament per twist pitch will be greater than when the second and/or fourth metallic filament is wrapped in the opposite direction, so that gaps can be more reliably formed between the metallic filaments.

The second and fourth metallic filaments should be wrapped around the first and third metallic filament with pitches $p_1$ and $p_2$ not exceeding 0.991 of the twist pitch P. This is because if the $p_1$ and $p_2$ values are too close to the twist pitch P, the gaps between the filaments tend to be small.

Also, the ratio of the wrapping pitches $p_1$ or $p_2$ to the twist pitch P should be equal to or greater than 0.922 to keep high compressive rigidity. This is because while the smaller the wrapping pitches $p_1$ and $p_2$, the higher the degree of penetration of rubber, the lower the wrapping pitches $p_1$ and $p_2$, the cord can be bent more easily, and the compressive rigidity lowers. Thus the ratio of the wrapping pitches $p_1$ and $p_2$ to the twist pitch P is preferably not less than 0.922.

The twist angle α (degrees) of the metallic cord, which is determined by the twist pitch and the diameter of the cord, is preferably not less than 3.5 degrees (the value below which the cord tends to spread radially outwardly at their ends), and not more than 7.3 degrees (the value above which, as with the wrapping pitches $p_1$ and $p_2$, the cord can be easily bent, and thus the compressive rigidity lowers).

For the abovementioned reasons, the rubber product-reinforcing metallic cord according to the present invention can be manufactured by the method of the present invention at a low production cost using a simple facility.

Figure 1:
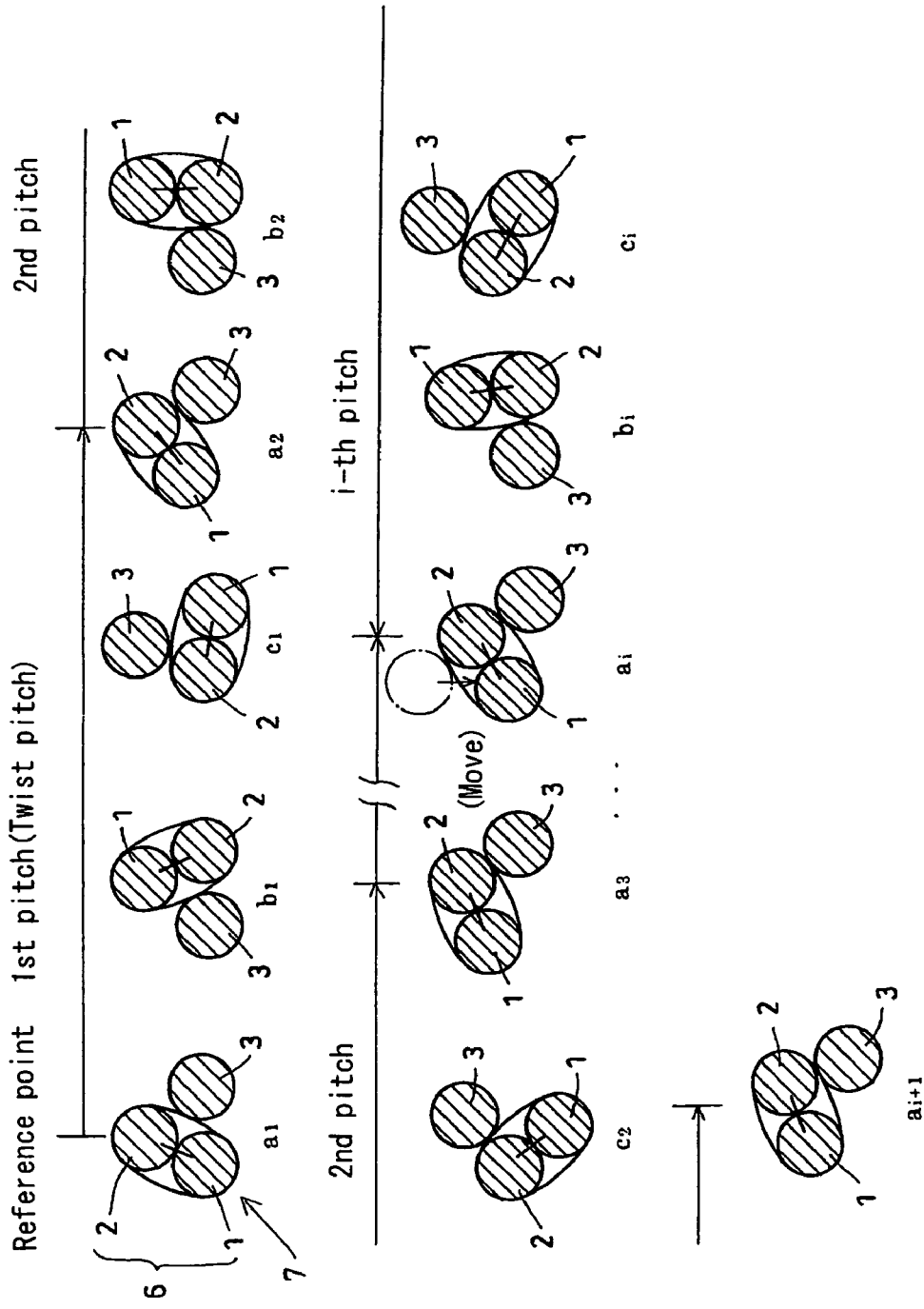
FIG. 1 a schematic view of sections of a metallic cord of a first embodiment of this invention, which is formed by twisting three filaments together, taken along planes longitudinally separated from each other by a distance of ⅓ of the twist pitch FIG. 2 a perspective view of two filaments, showing how one of the two filaments is wrapped around the other filament FIG. 3 a schematic view of sections of a metallic cord of a second embodiment of this invention, which is formed by twisting four filaments together, taken along planes longitudinally separated from each other by a distance of ¼ of the twist pitch FIG. 4 a perspective view of two pre-strands each comprising two filaments, showing how one of the two filaments forming each pre-strand is wrapped around the other filament FIG. 5 a sectional view of a metallic cord of a third embodiment of this invention, which is formed by twisting five filaments together FIG. 6 a schematic view of an apparatus for manufacturing the metallic cord of the first embodiment FIG. 7 a schematic view of an apparatus for manufacturing the metallic cord of the second embodiment FIG. 8 a view defining the twist angle FIG. 9 a sectional view of a conventional 1×3×d cord with two-dimensional corrugations FIG. 10 a sectional view of a conventional 1×3×d cord with three-dimensional corrugations FIG. 11 a sectional view of a conventional 1×4×d cord with two-dimensional corrugations FIG. 12 a sectional view of a conventional 1×5×d cord with two-dimensional corrugations FIG. 13 a sectional view of a conventional 1×4×d cord with three-dimensional corrugations FIG. 14 a sectional view of a conventional 1×5×d cord with three-dimensional corrugations

DESCRIPTION OF NUMERALS 1-5: metallic filaments
6, $6a_1$ and $6a_2$: pre-strands of filaments
7-9: rubber product-reinforcing metallic cords
$10_{-1}$-$10_{-3}$: reel supports
$11_{-1}$-$11_{-6}$: reels
$12_{-1}$-$12_{-3}$: guides
13, $13_{-1}$ and $13_{-2}$: reel supports
14, $14_{-1}$ and $14_{-2}$: flyers
15, $15_{-1}$ and $15_{-2}$: rollers for preventing untwisting of filaments
16: twister
17: apertured plate
18: twist port
19: straightener

BEST MODE FOR EMBODYING THE INVENTION

Now the embodiments of this invention are described with reference to FIGS. 1 to 7. FIG. 1 schematically shows cross-sections of a rubber product-reinforcing metallic cord 7 of the first embodiment which are taken along planes longitudinally separated from each other by a distance of ⅓P (P=twist pitch of the cord). The cord of this embodiment may be twisted in the pattern of the letter Z. But the cord shown and described is twisted in the pattern of the letter S.

Figure 2:
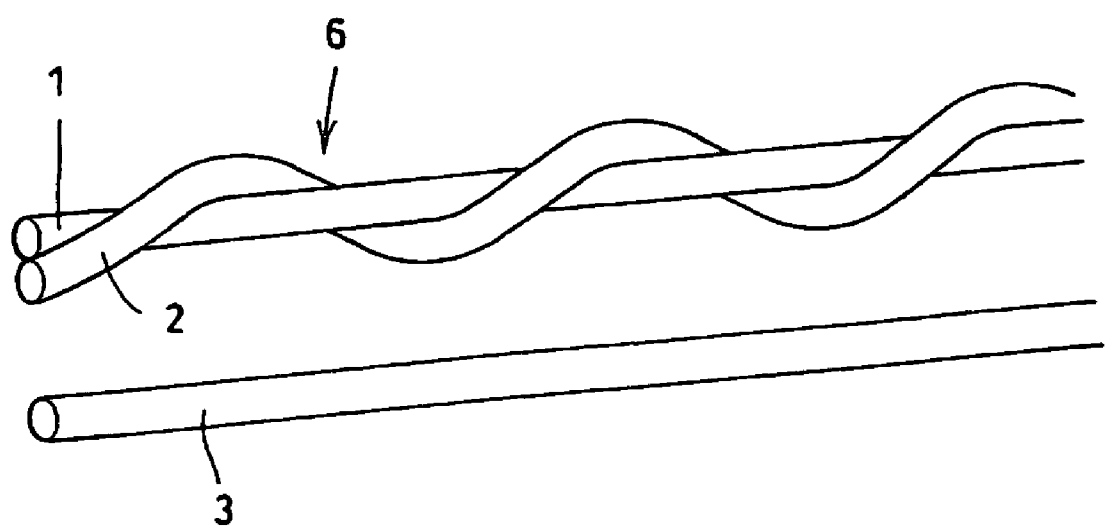

As shown in FIG. 2, the metallic cord 7 is formed by helically wrapping a metallic filament 2 around a metallic filament 1 to form a pre-strand 6, and twisting together the pre-strand 6 and another metallic filament 3. If plated steel filaments are used as the filaments 1 to 3, the cord will be a steel cord. But the cord according to the present invention is not limited to a steel cord.

Because the pre-strand 6 and the filament 3 are three-dimensionally twisted in the pattern of the letter S, and the metallic filament 2 is further wrapped around the metallic filament 1, the metallic filament 2 acts as a spacer to define suitable gaps between the pre-strand 6 and the metallic filament 3. The gaps improve the degree of penetration of rubber into the cord. Each filament is not corrugated or otherwise irregularly preshaped, so that the cord 7 has a compressive rigidity equivalent to a closed cord having a 1×3 construction, which is high in compressive rigidity but is extremely low in the degree of penetration of rubber. In particular, a closed cord having a 1×3 construction is formed if three metallic filaments are simply twisted together. In such a closed cord, gaps isolated from outside are present. Since rubber cannot penetrate into such isolated gaps, this cord is low in the degree of penetration of rubber. The cord according to the present invention is not a closed cord, because the pre-strand 6 is formed by helically wrapping the metallic filament 2 around the metallic filament 1, and then the pre-strand 6 and the filament are twisted together.

In order not to form gaps isolated from outside, the metallic filament 2 is preferably wrapped around the metallic filament 1 in the same direction as the cord is twisted. For the reasons set forth above, the pitch $p_1$ with which the metallic filament 2 is wrapped around the filament 1 preferably satisfies the relation $0.922 \leq p_1/P \leq 0.991$.

The twist angle α is preferably 3.5 to 7.3 degrees for the abovementioned reasons.

Figure 3:
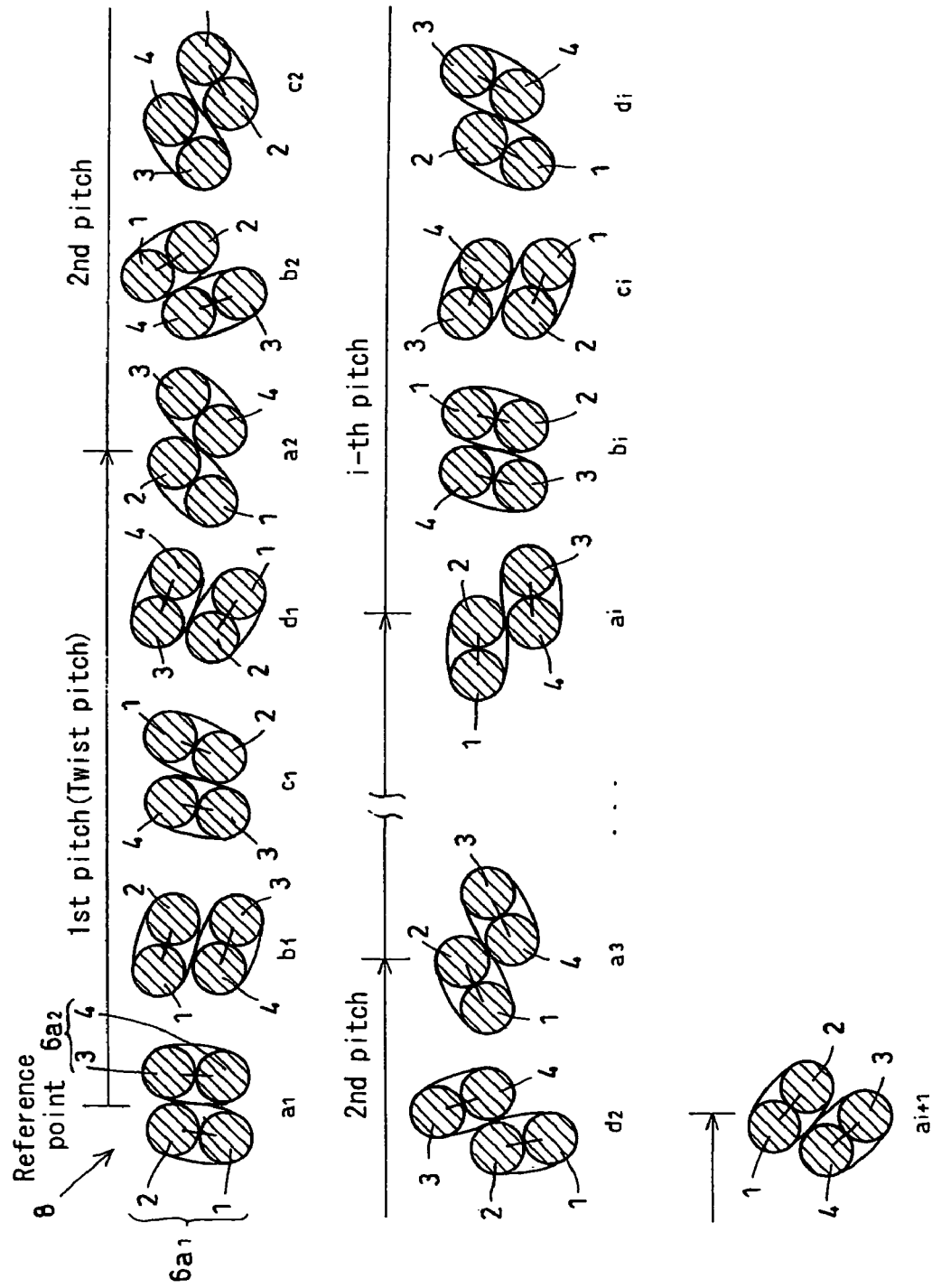

FIG. 3 schematically shows cross-sections of a rubber product-reinforcing metallic cord 8 of the second embodiment, taken along planes longitudinally separated from each other by a distance ¼P (P=twist pitch of the cord). The cord of the second embodiment may also be twisted in the pattern of the letter Z or S. The cord shown is twisted in the pattern of the letter S.

Figure 4:
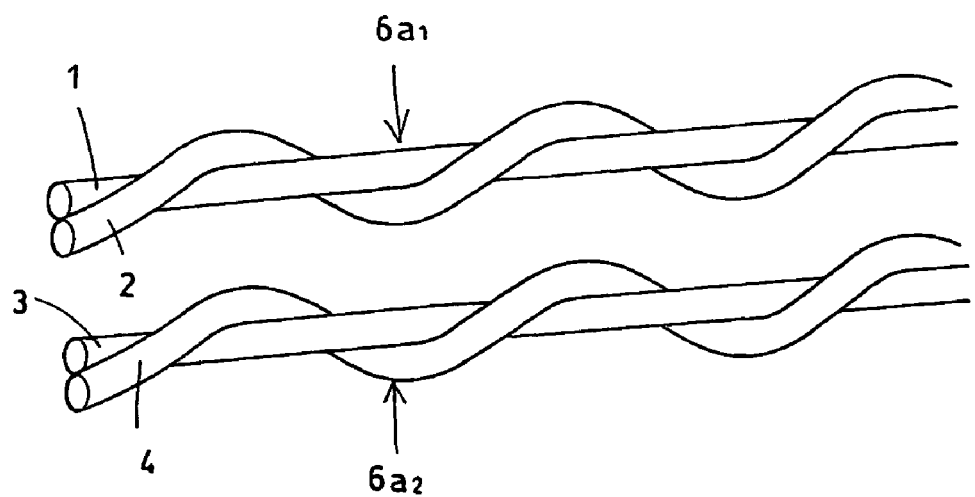

As shown in FIG. 4, the metallic cord 8 of the second embodiment is formed by helically wrapping a metallic filament 2 around a metallic filament 1 to form a pre-strand $6a_1$, helically wrapping a metallic filament 4 around a metallic filament 3 to form a pre-strand $6a_2$, and twisting together the pre-strands $6a_1$ and $6a_2$ with a pitch P.

If plated steel filaments are used as the filaments 1 to 4, the cord will be a steel cord. But the cord according to the present invention is not limited to a steel cord.

Because the pre-strands $6a_1$ and $6a_2$ are three-dimensionally twisted in the pattern of the letter S, and the metallic filaments 2 and 4 are further wrapped around the metallic filaments 1 and 3, respectively, the metallic filaments 2 and 4 act as a spacer to define suitable gaps between the respective metallic filaments. The gaps improve the degree of penetration of rubber into the cord.

Each filament is not corrugated or otherwise irregularly preshaped, so that the cord 7 has a compressive rigidity equivalent to a closed cord having a 1×4 construction, which is high in compressive rigidity but is extremely low in the degree of penetration of rubber. In particular, a closed cord having a 1×4 construction is formed if four metallic filaments are simply twisted together. In such a closed cord, gaps isolated from outside are present. Since rubber cannot penetrate into such isolated gaps, this cord is low in the degree of penetration of rubber. The cord according to the present invention is not a closed cord, because the pre-strands $6a_1$ and $6a_2$ are formed by helically wrapping the metallic filaments 2 and 4 around the metallic filaments 1 and 3, respectively, and then the pre-strands $6a_1$ and $6a_2$ are twisted together.

At least one of the metallic filaments 2 and 4 should be wrapped around the corresponding metallic filament 1 or 3 in the same direction as the cord is twisted. With this arrangement, the filaments 2 and 4 make more than one turn per twist of the cord. This facilitates formation of gaps between the filaments.

For the aforementioned reasons, the metallic filaments 2 and 4 should be wrapped around the metallic filaments 1 and 3 with pitches $p_1$ and $p_2$ so as to satisfy the relations $0.922 \leq p_1/P \leq 0.991$ and $0.922 \leq p_2/P \leq 0.991$, respectively.

As in the first embodiment, the twist angle α is preferably 3.5 to 7.3 degrees.

Figure 6:
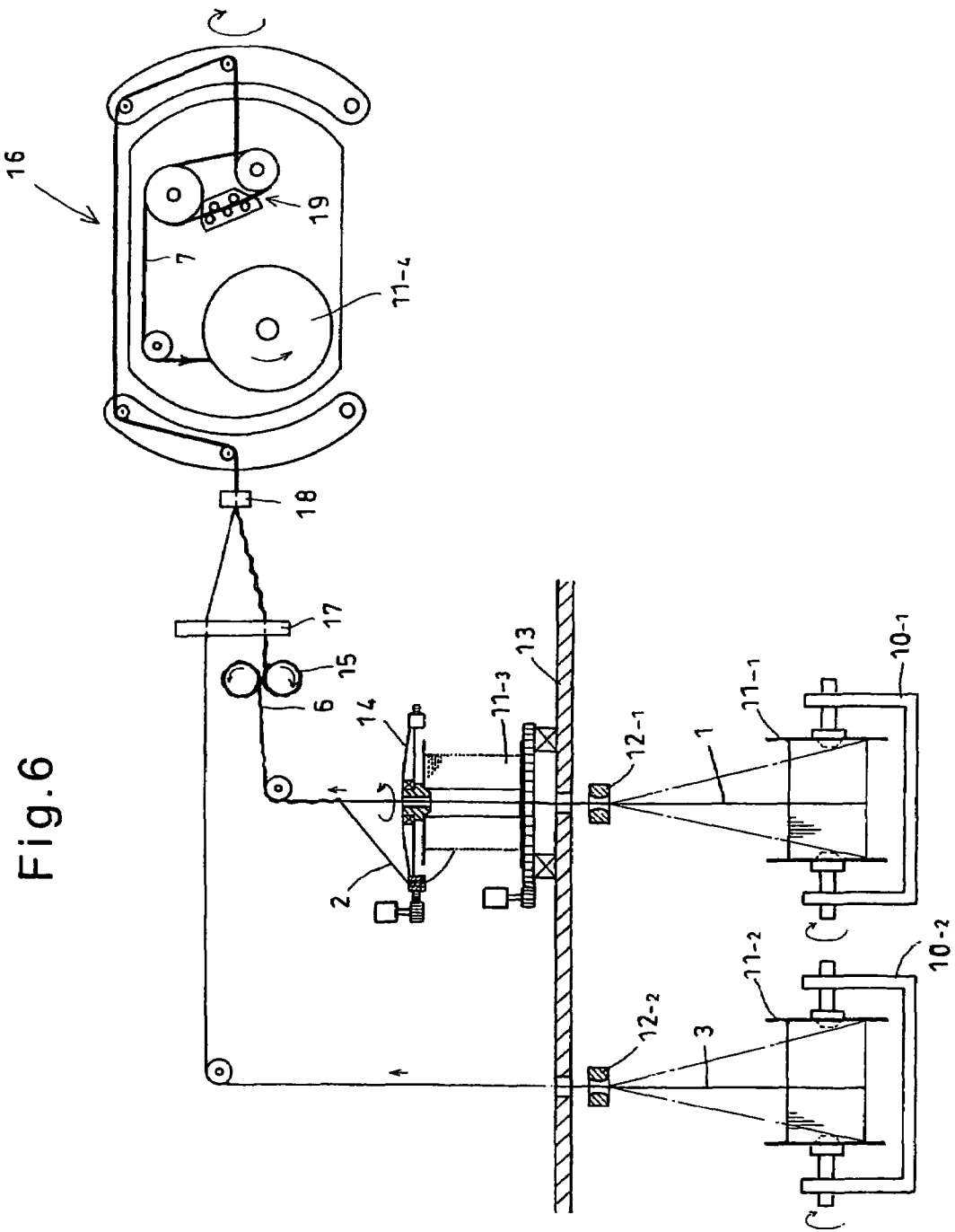

Now referring to FIG. 6, description is made of a method for manufacturing the rubber product-reinforcing metallic cord (of the first embodiment) according to the present invention. As shown in FIG. 6, the apparatus for manufacturing the cord according to the invention includes reel supports $10_{-1}$ and $10_{-2}$ rotatably supporting reels $11_{-1}$ and $11_{-2}$, respectively, guides $12_{-1}$ and $12_{-2}$, a support plate 13 rotatably supporting a reel $11_{-3}$, a flyer 14, rollers 15 for preventing unwinding of filaments, and a twister 16 having an apertured plate 17 and a twist port 18.

A metallic filament 1 is unrolled from the reel $11_{-1}$, fed through the guide $12_{-1}$ and a center guide of the flyer 12, and comes out of the flyer 12. A metallic filament 2 unrolled from the reel $11_{-3}$ is helically wrapped around the filament 1 at its portion protruding from the flyer 12. If the reel $11_{-3}$ is non-rotatable, the pitch with which the filament 2 is wrapped around the filament 1 would vary with the amount of the filament wound on the reel $11_{-3}$. But in the embodiment shown, the reel $11_{-3}$ is rotatable and driven by a driving source at such a speed that the pitch with which the filament 2 is wrapped around the filament 1 is constant. With this arrangement, the residual torsion of the twisted cord stabilizes, too. The metallic filament 2 is unrolled from the reel $11_{-3}$ by the rotating flyer 14, and helically wrapped around the metallic filament 1 while being twisted once per rotation of the flyer 14. By twisting the metallic filament 2, it can be spontaneously wrapped around the metallic filament 1.

The thus formed pre-strand 6 is fed into between the rollers 15 and wound diagonally thereon so that the filaments will not unwound. The pre-strand 6 is then fed through a guide hole of the apertured plate 17, and fed into the twister 16 through the twist port 18, together with another metallic filament 3 that is unrolled from the reel $11_{-2}$ and fed through a guide $12_{-2}$ and a guide hole of the apertured plate 17. In the twister 16, the pre-strand 6 and the metallic filament 3 are twisted together and fed through a straightener 19. The thus formed metallic cord 7 is wound on a reel $11_{-4}$. The straightener 19 not only straightens the cord but repositions any longitudinal portion of any filament that is extremely unstably positioned (see the $a_1$ section at the i-th pitch of FIG. 1).

If a cord twisted in the pattern of S is to be formed, the metallic filament 2 can be wrapped around the metallic filament 1 in the same direction as the twist direction of the cord by rotating the flyer 14 counterclockwise as viewed from top.

The filaments 1 and 3 should be fed by rotating the reels $11_{-1}$ and $11_{-2}$ with a driving unit or units so that the filaments 1 and 3 will not be twisted until the pre-strand 6 and the filament 3 are twisted together in the twister 16.

Figure 7:
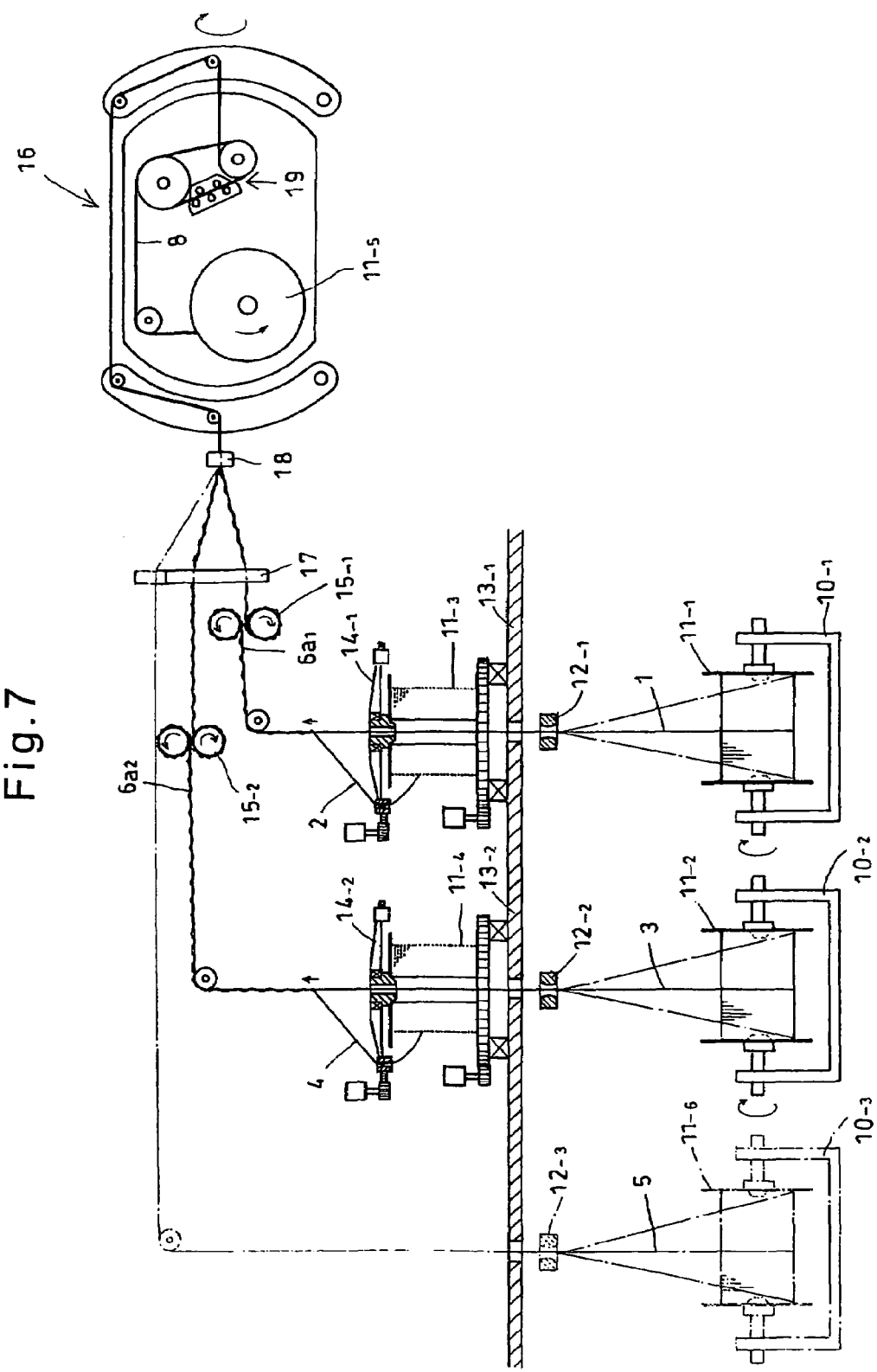
Figure 8:
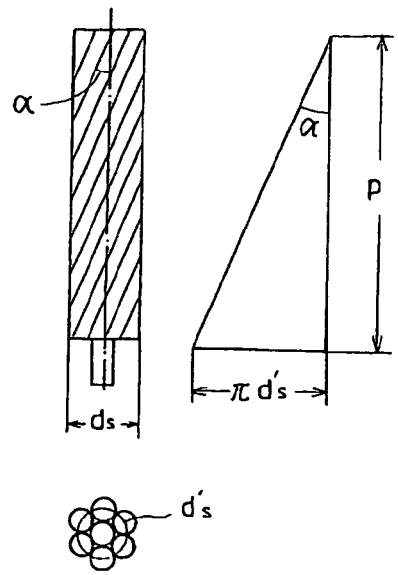

Now referring to FIG. 7, description is made of a method for manufacturing the rubber product-reinforcing metallic cord of the second embodiment shown in FIG. 3. The apparatus for manufacturing the cord of the second embodiment includes reel supports $10_{-1}$ and $10_{-2}$ rotatably supporting reels $11_{-1}$ and $11_{-2}$, respectively, guides $12_{-1}$ and $12_{-2}$, support plates $13_{-1}$ and $13_{-2}$ rotatably supporting reels $11_{-3}$ and $11_{-4}$, respectively, flyers $14_{-1}$ and $14_{-2}$, two pairs of rollers $15_{-1}$ and $15_{-2}$ for preventing unwinding of filaments, and a twister 16 having an apertured plate 17 and a twist port 18.

Metallic filaments 1 and 2 are unrolled from the reels $11_{-1}$ and $11_{-2}$, fed through the guide $12_{-1}$ and $12_{-2}$ and center guides of the flyers $14_{-1}$ and $14_{-2}$, and come out of the flyers $14_{-1}$ and $14_{-2}$, respectively. Metallic filaments 2 and 4 unrolled from the reels $11_{-3}$ and $11_{-4}$ are helically wrapped around the filaments 1 and 2 at their portions protruding from the flyers $14_{-1}$ and $14_{-2}$, respectively. The reels $11_{-3}$ and $11_{-4}$ are rotatable and driven by driving sources at such speeds that the pitch with which each filament 2, 4 is wrapped around the corresponding filament 1, 3 is constant. With this arrangement, the residual torsion of the twisted cord stabilizes, too. The metallic filaments 2 and 4 are unrolled from the reels $11_{-3}$ and $11_{-4}$ by the rotating flyers, and helically wrapped around the metallic filaments 1 and 3 while being twisted once per rotation of the flyers 2. By twisting the metallic filaments 2 and 4, they can be spontaneously wrapped around the metallic filaments 1 and 3.

The thus formed pre-strands $6a_1$ and $6a_2$ are fed into between the respective pairs of rollers $15_{-1}$ and $15_{-2}$, and wrapped diagonally thereon so that the filaments will not unwound. The pre-strands $6a_1$ and $6a_2$ are then fed through guide holes of the apertured plate 17, and fed into the twister 16 through the twist port 18. In the twister 16, the pre-strands $6a_1$ and $6a_2$ are twisted together and fed through a straightener 19. The thus formed metallic cord 8 is wound on a reel $11_{-5}$.

If a cord twisted in the pattern of S is to be formed, the metallic filaments 2 and 4 can be wrapped around the metallic filament 1 and 3 in the same direction as the twist direction of the cord by rotating the flyers $14_{-1}$ and $14_{-2}$ counterclockwise as viewed from top. In the embodiment, the pre-strands $6a_1$ and $6a_2$ are identical in construction with their metallic filaments 2 and 4 wrapped in the same direction with the same pitch.

The filaments 1 and 3 should be fed by rotating the reels $11_{-1}$ and $11_{-2}$ with a driving unit or units so that the filaments 1 and 3 will not be twisted until the pre-strands $6a_1$ and $6a_2$ are twisted together in the twister 16.

Figure 5:
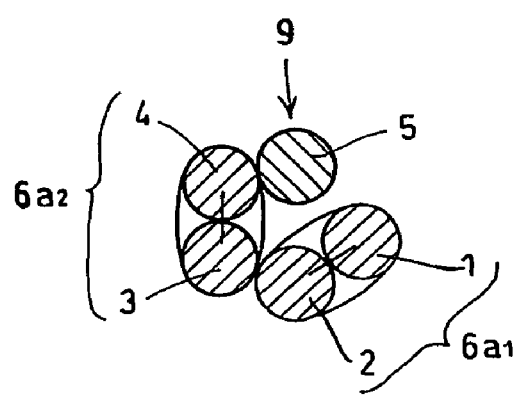

The present invention also encompasses a metallic cord 9 of a 1×5 construction as shown in FIG. 5, which is formed by twisting together the pre-strands $6a_1$ and $6a_2$ and another metallic filament 5. The apparatus for manufacturing the cord 9 includes, besides all the components necessary to manufacture the cord 8 of the second embodiment (see FIG. 7), an additional reel $11_{-6}$ rotatably supported on a support $10_{-3}$ and driven by a driving source (see the phantom lines in FIG. 7). The metallic filament 5 is unrolled from the reel $11_{-6}$, and fed through a guide $12_{-3}$. The filament 5 and the pre-strands $6a_1$ and $6a_2$ are then twisted together in the twister 16 into the cord 9.

Cord samples according to the first embodiment of the invention (cord samples (2) of which the wrapping pitch $p_1$ and the twist angle α are within the preferred ranges, and cord samples (1) of which the wrapping pitch $p_1$ and the twist angle α are outside of the preferred ranges) and conventional cord samples were prepared and subjected to various performance comparative tests. The results of the tests are shown in Table 1.

TABLE 1

|  |  | Cord construction | Diameter of filament (mm) | Final twist pitch and twist direction (mm), direction | wrapping pitch $p_1$ and direction of a filament of the pre-stand (mm), direction | $p_1/P$ — | Twist angle (°) | Penetration of rubber (%) | Compressive rigidity index — | Appearance of cord |
|---|---|---|---|---|---|---|---|---|---|---|
| Conventional samples | No. 1 | 1 × 3 × d (2D waves) | 0.27 | 12.5S | — | — | 4.5 | 90 | 100 | Good |
|  | No. 2 | 1 × 3 × d (3D waves) | 0.27 | 12.5S | — | — | 4.5 | 80 | 100 | Good |
| Samples (1) of the invention | No. 3 | 1 × ((1 + 1) + 1) × d | 0.27 | 12.5S | 12.4S | 0.992 | 4.8 | 60 | 106 | Good |
|  | No. 4 | 1 × ((1 + 1) + 1) × d | 0.27 | 12.5S | 11.3S | 0.904 | 4.8 | 90 | 105 | Good |
|  | No. 5 | 1 × ((1 + 1) + 1) × d | 0.27 | 16.5S | 15.8S | 0.958 | 3.2 | 80 | 109 | Spread ends |
|  | No. 6 | 1 × ((1 + 1) + 1) × d | 0.27 | 7.5S | 7.1S | 0.947 | 7.5 | 70 | 103 | Good |
|  | No. 7 | 1 × ((1 + 1) + 1) × d | 0.27 | 7.5S | 7.45S | 0.993 | 7.5 | 50 | 104 | Good |
| Samples (2) of the invention | No. 8 | 1 × ((1 + 1) + 1) × d | 0.27 | 12.5S | 12.3S | 0.984 | 4.8 | 80 | 110 | Good |
|  | No. 9 | 1 × ((1 + 1) + 1) × d | 0.27 | 12.5S | 11.6S | 0.928 | 4.8 | 90 | 109 | Good |
|  | No. 10 | 1 × ((1 + 1) + 1) × d | 0.27 | 15.5S | 14.8S | 0.955 | 3.7 | 90 | 111 | Good |
|  | No. 11 | 1 × ((1 + 1) + 1) × d | 0.27 | 8.0S | 7.6S | 0.950 | 7.1 | 80 | 106 | Good |
|  | No. 12 | 1 × ((1 + 1) + 1) × d | 0.27 | 8.0S | 7.8S | 0.975 | 7.1 | 80 | 107 | Good |
|  | No. 13 | 1 × ((1 + 1) + 1) × d | 0.27 | 12.5S | 11.9S | 0.952 | 4.8 | 90 | 110 | Good |

Each conventional cord sample had only one of its metallic filaments corrugated under the following conditions.

Figure 9:
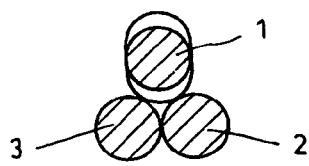
Figure 10:
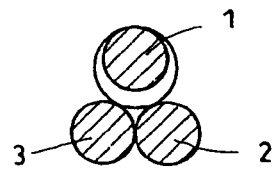

Two-Dimensional Corrugations
Pitch (in the initial stage): 4.7 mm
Height (after twisting): 0.025±0.005 mm Three-Dimensional Corrugations
Pitch (in the initial stage): 1/2.5×P (P=twist pitch of the cord)
Height (after twisting): 0.028±0.005 mm FIG. 9 shows a cross-section of a conventional cord of a 1×3×d construction with two-dimensional corrugations, and FIG. 10 shows a cross-section of a conventional cord of a 1×3×d construction with three-dimensional corrugations.

—Description of the Properties in Table 1—

(1) Degree of Penetration of Rubber

With each metallic cord embedded in rubber while applying a tension of 500 gf to the cord, the rubber was vulcanized under pressure to form a cord-reinforced rubber sample, the cord was pulled out of the rubber, its two filaments were separated from the remaining one filament, and the two filaments and the one filament were observed by the naked eye or with a magnifying glass. Any sample of which rubber has penetrated into the cord over the entire length thereof was determined to be 100% in the degree of penetration of rubber.

(2) Compressive Rigidity

Each rubber sample prepared in (1) was cut so that the thickness of the portion of the rubber where there was the cord was 0.5 mm, and compressed to a predetermined stroke with a compression tester. The compressive rigidity of each sample was then measured with the compressive rigidity of a reference cord (sample No. 1 in Table 1, which has a 1×3 construction) set at 100%.

Compression Conditions
Grip distances: 50 mm
Stroke: 6 mm
Compression speed: 10 mm/minute The test results of Table 1 clearly show that among the cord samples according to the first embodiment, the cord samples (2) according to the invention, of which all the parameters were within the preferred ranges, were especially superior in the degree of penetration of rubber and compressive rigidity.

Cord samples according to the second and third embodiments of the invention (cord samples (2) of which the wrapping pitch $p_1$ and the twist angle α are within the preferred ranges, and cord samples (1) of which the wrapping pitch $p_1$ and the twist angle α are outside of the preferred ranges) and conventional cord samples were prepared and subjected to various performance comparative tests. The results of the tests are shown in Table 2.

TABLE 2

| | No. | Cord Construction | | Diameter of filament (mm) | Twist pitch and twist direction (mm) dir. | wrapping pitch $p_1$ and direction of first pre-strand (mm) dir. | $p_1/P$ — | wrapping pitch $p_2$ and direction of second pre-strand (mm) dir. | $p_2/P$ — | Twist pitch and twist direction (°) | Penetration of rubber (%) | Compressive rigidity index — | |
|---|---|---|---|---|---|---|---|---|---|---|---|---|---|
| 1 × 4 construction Conventional samples | (1) | 1 × 4 × d (2D waves) | | 0.25 | 13.0S | — | — | — | — | 4.9 | 80 | 100 | Good (1 × 4 reference cord) |

TABLE 2-continued

| | | No. | Cord Construction | Diameter of filament (mm) | Twist pitch and twist direction (mm) dir. | wrapping pitch $p_1$ and direction of first pre-strand (mm) dir. | $p_1/P$ | wrapping pitch $p_2$ and direction of second pre-strand (mm) dir. | $p_2/P$ | Twist pitch and twist direction (°) | Penetration of rubber (%) | Compressive rigidity index | |
|---|---|---|---|---|---|---|---|---|---|---|---|---|---|
| | | (2) | 1 × 4 × d (3D waves) | 0.25 | 13.0S | — | — | — | — | 4.9 | 70 | 101 | Good |
| | Samples (1) of the invention | (3) | 1 × ((1 + 1) + (1 + 1)) × d | 0.25 | 13.0S | 12.9S | 0.992 | 12.9S | 0.992 | 4.9 | 40 | 106 | Good |
| | | (4) | 1 × ((1 + 1) + (1 + 1)) × d | 0.25 | 13.0S | 11.7S | 0.900 | 11.7S | 0.900 | 4.9 | 80 | 104 | Good |
| | | (5) | 1 × ((1 + 1) + (1 + 1)) × d | 0.25 | 13.0S | 12.7S | 0.977 | 12.9S | 0.992 | 4.9 | 70 | 105 | Good |
| | | (6) | 1 × ((1 + 1) + (1 + 1)) × d | 0.25 | 13.0S | 12.2S | 0.938 | 11.5S | 0.885 | 4.9 | 80 | 104 | Good |
| | | (7) | 1 × ((1 + 1) + (1 + 1)) × d | 0.25 | 8.5S | 7.6S | 0.894 | 7.6S | 0.894 | 7.4 | 80 | 103 | Slightly unstable in shape |
| | Samples (2) of the invention | (8) | 1 × ((1 + 1) + (1 + 1)) × d | 0.25 | 19.0S | 18.4S | 0.968 | 18.4S | 0.968 | 3.3 | 80 | 105 | Spread ends |
| | | (9) | 1 × ((1 + 1) + (1 + 1)) × d | 0.25 | 8.5S | 8.2S | 0.965 | 8.2S | 0.965 | 7.4 | 70 | 103 | Good |
| | | (10) | 1 × ((1 + 1) + (1 + 1)) × d | 0.25 | 13.0S | 12.8S | 0.985 | 12.8S | 0.985 | 4.9 | 80 | 108 | Good |
| | | (11) | 1 × ((1 + 1) + (1 + 1)) × d | 0.25 | 13.0S | 12.1S | 0.931 | 12.1S | 0.931 | 4.9 | 90 | 107 | Good |
| | | (12) | 1 × ((1 + 1) + (1 + 1)) × d | 0.25 | 13.0S | 12.4S | 0.954 | 12.8S | 0.985 | 4.9 | 80 | 108 | Good |
| | | (13) | 1 × ((1 + 1) + (1 + 1)) × d | 0.25 | 17.0S | 15.8S | 0.935 | 15.8S | 0.935 | 3.7 | 90 | 110 | Good |
| | | (14) | 1 × ((1 + 1) + (1 + 1)) × d | 0.25 | 9.0S | 8.4S | 0.933 | 8.4S | 0.933 | 7.0 | 90 | 106 | Good |
| | | (15) | 1 × ((1 + 1) + (1 + 1)) × d | 0.25 | 17.0S | 16.6S | 0.976 | 16.6S | 0.976 | 3.7 | 80 | 111 | Good |
| | | (16) | 1 × ((1 + 1) + (1 + 1)) × d | 0.25 | 9.0S | 8.7S | 0.967 | 8.7S | 0.967 | 7.0 | 90 | 108 | Good |
| 1 × 5 construction | Conventional samples | (17) | 1 × 5 × d (2D waves) | 0.23 | 14.5S | — | — | — | — | 4.8 | 70 | 100 | Good (1 × 5 reference cord) |
| | | (18) | 1 × 5 × d (2D waves) | 0.23 | 14.5S | — | — | — | — | 4.8 | 70 | 100 | Good |
| | Samples (1) of the invention | (19) | 1 × ((1 + 1) + (1 + 1)) × d | 0.23 | 14.5S | 14.4S | 0.993 | 14.4S | 0.993 | 4.9 | 40 | 108 | Good |
| | | (20) | 1 × ((1 + 1) + (1 + 1)) × d | 0.23 | 14.5S | 12.9S | 0.890 | 12.9S | 0.890 | 4.9 | 90 | 106 | Slightly unstable in shape |
| | | (21) | 1 × ((1 + 1) + (1 + 1)) × d | 0.23 | 14.5S | 14.0S | 0.966 | 14.4S | 0.993 | 4.9 | 70 | 107 | Good |
| | | (22) | 1 × ((1 + 1) + (1 + 1)) × d | 0.23 | 14.5S | 13.6S | 0.938 | 12.8S | 0.883 | 4.9 | 90 | 106 | Good |
| | | (23) | 1 × ((1 + 1) + (1 + 1)) × d | 0.23 | 9.4S | 8.5S | 0.904 | 8.5S | 0.904 | 7.5 | 80 | 105 | Slightly unstable in shape |
| | | (24) | 1 × ((1 + 1) + (1 + 1)) × d | 0.23 | 20.5S | 19.7S | 0.961 | 19.7S | 0.961 | 3.4 | 80 | 107 | Spead ends |
| | | (25) | 1 × ((1 + 1) + (1 + 1)) × d | 0.23 | 9.4S | 9.1S | 0.968 | 9.1S | 0.968 | 7.5 | 70 | 106 | Good |
| | Samples (2) of the invention | (26) | 1 × ((1 + 1) + (1 + 1)) × d | 0.23 | 14.5S | 14.3S | 0.986 | 14.3S | 0.986 | 4.9 | 80 | 109 | Good |
| | | (27) | 1 × ((1 + 1) + (1 + 1)) × d | 0.23 | 14.5S | 13.5S | 0.931 | 13.5S | 0.931 | 4.9 | 90 | 108 | Good |
| | | (28) | 1 × ((1 + 1) + (1 + 1)) × d | 0.23 | 14.5S | 14.0S | 0.952 | 14.3S | 0.986 | 4.9 | 80 | 109 | Good |
| | | (29) | 1 × ((1 + 1) + (1 + 1)) × d | 0.23 | 19.5S | 18.6S | 0.954 | 18.2S | 0.933 | 3.6 | 90 | 111 | Good |
| | | (30) | 1 × ((1 + 1) + (1 + 1)) × d | 0.23 | 10.0S | 9.3S | 0.930 | 9.3S | 0.930 | 7.0 | 90 | 109 | Good |
| | | (31) | 1 × ((1 + 1) + (1 + 1)) × d | 0.23 | 19.5S | 18.9S | 0.969 | 18.9S | 0.969 | 3.6 | 80 | 112 | Good |
| | | (32) | 1 × ((1 + 1) + (1 + 1)) × d | 0.23 | 10.0S | 9.7S | 0.970 | 9.7S | 0.970 | 7.0 | 80 | 110 | Good |

Each conventional cord sample had only one of its metallic filaments corrugated under the following conditions.

Two-Dimensional Corrugations

Pitch (in the initial stage): 4.7 mm

Height (after twisting): 0.025±0.005 mm

Three-Dimensional Corrugations

Pitch (in the initial stage): 1/2.5×P (P=twist pitch of the cord)

Height (after twisting): 0.028±0.005 mm

Figure 11:
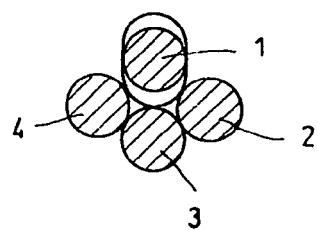
Figure 12:
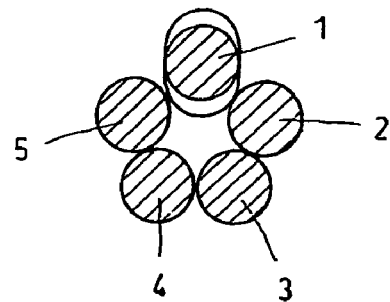
Figure 13:
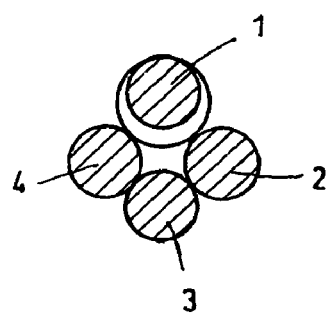
Figure 14:
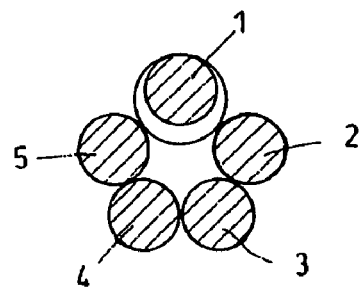

FIG. 11 shows a cross-section of a conventional cord of a 1×4×d construction with two-dimensional corrugations, FIG. 12 shows a cross-section of a conventional cord of a 1×5×d construction with two-dimensional corrugations, FIG. 13 shows a cross-section of a conventional cord of a 1×4×d construction with three-dimensional corrugations, and FIG. 14 shows a cross-section of a conventional cord of a 1×5×d construction with three-dimensional corrugations.

—Description of the Properties in Table 2—

(1) Degree of Penetration of Rubber

With each metallic cord embedded in rubber while applying a tension of 500 gf to the cord, the rubber was vulcanized under pressure to form a cord-reinforced rubber sample. The cord was then pulled out of the rubber. Then each cord comprising four metallic filaments was split into two groups each comprising two metallic filaments. Each cord comprising five metallic filaments was split into a group of two filaments and a group of three (two plus one) filaments. The thus split groups of filaments were observed by the naked eye or with a magnifying glass. Any sample of which rubber has penetrated into the cord over the entire length thereof was determined to be 100% in the degree of penetration of rubber.

(2) Compressive Rigidity

Each rubber sample prepared in (1) was cut so that the thickness of the portion of the rubber where there was the cord was 0.5 mm, and compressed to a predetermined stroke with a compression tester. The compressive rigidity of each sample was then measured with the compressive rigidity of reference cords (sample No. 1 in Table 2, which had a 1×4 construction, and sample No. 17, which had a 1×5 construction) set at 100%.

Compression Conditions
  Grip distances: 50 mm
  Stroke: 6 mm
  Compression speed: 10 mm/minute The test results of Table 2 clearly show that among the cord samples according to the second and third embodiments, which comprise four or five metallic filaments, the cord samples (2) according to the invention, of which all the parameters were within the preferred ranges, were especially superior in the degree of penetration of rubber and compressive rigidity.

The metallic cords according to the present invention can be manufactured using a simple apparatus as shown in FIG. 6 or 7. The facility cost and the manufacturing cost are thus low.

What is claimed is:

1. A rubber product-reinforcing metallic cord comprising a first pre-strand comprising a first metallic filament and a second metallic filament helically wrapped around said first metallic filament, and a fifth metallic filament, said first pre-strand and said fifth metallic filament being twisted together with a twist pitch P wherein said second metallic filament is wrapped around said first metallic filament with a pitch $p_1$ which satisfies, with respect to the twist pitch P of the cord, the relation $0.922 \leq p_1/P \leq 0.991$.

2. The rubber product-reinforcing metallic cord of claim 1 wherein said second metallic filament is wrapped around said first metallic filament in the same direction as the cord is twisted.

3. A method of manufacturing the rubber product-reinforcing metallic cord of claim 1, comprising passing said first metallic filament through the center of a pass line, helically wrapping said second metallic filament around said first metallic filament with a first flyer to form said first pre-strand, introducing said first pre-strand and said fifth metallic filament into a twister, and twisting said first pre-strand and said fifth metallic filament together with the twist pitch P.

4. A method of manufacturing a rubber product-reinforcing metallic cord of claim 3 wherein said second metallic filament is supplied from a driven wheel, and said flyer is driven by a driving source so as to twist said second metallic filament once per rotation of said flyer so that said second metallic filament is wrapped around said first metallic filament with a constant pitch.

5. A method of manufacturing a rubber product-reinforcing metallic cord of claim 3 wherein said first metallic filament, which is passed through the center of the pass line, is supplied from a reel driven by a driving source.

6. The rubber product-reinforcing metallic cord of claim 1 which is twisted with a twist angle α in a range of 3.5 to 7.3 degrees.

7. A rubber product-reinforcing metallic cord comprising a first pre-strand comprising a first metallic filament and a second metallic filament helically wrapped around said first metallic filament, and a second pre-strand comprising a third metallic filament and a fourth metallic filament helically wrapped around said third metallic filament, said first and second pre-strands being twisted together with a pitch P wherein at least one of said second and fourth metallic filaments is wrapped around the corresponding one of said first and third metallic filaments with a pitch $p_1$ which satisfies, with respect to the twist pitch P of the cord, the relation $0.922 \leq p_1/P \leq 0.991$.

8. A method of manufacturing a rubber product-reinforcing metallic cord of claim 7, comprising passing said first and third metallic filaments through the centers of pass lines, helically wrapping said second and fourth metallic filaments around said first and third metallic filaments with first and second flyers to form said first and second pre-strands, respectively, introducing said first and second pre-strands into a twister, and twisting said first and second pre-strands together with the pitch P.

9. The rubber product-reinforcing metallic cord of claim 7, wherein at least one of said second and fourth metallic filaments is wrapped around the corresponding one of said first and third metallic filaments in the same direction as the cord is twisted.

10. The rubber product-reinforcing metallic cord of claim 7, comprising said first and second pre-strands, wherein said second and fourth metallic filaments are wrapped around the first and third metallic filaments with pitches $p_1$ and $p_2$, respectively, which satisfy, with respect to the pitch P of the cord, the relations $0.922 \leq p_1/P \leq 0.991$ and $0.922 \leq p_2/P \leq 0.991$.

11. The rubber product-reinforcing metallic cord of claim 7, which is twisted with a twist angle α in a range of 3.5 to 7.3 degrees.

12. A rubber product-reinforcing metallic cord comprising a first pre-strand comprising a first metallic filament and a second metallic filament helically wrapped around said first metallic filament, a second pre-strand comprising a third metallic filament and a fourth metallic filament helically wrapped around said third metallic filament, and a fifth metallic filament, said first and second pre-strands and said fifth metallic filament being twisted together with a pitch P wherein at least one of said second and fourth metallic filaments is wrapped around the corresponding one of said first and third metallic filaments with a pitch $p_1$ which satisfies, with respect to the twist pitch P of the cord, the relation $0.922 \leq p_1/P \leq 0.991$.

13. The rubber product-reinforcing metallic cord of claim 12, wherein at least one of said second and fourth metallic filaments is wrapped around the corresponding one of said first and third metallic filaments in the same direction as the cord is twisted.

14. The rubber product-reinforcing metallic cord of claim 12, comprising said first and second pre-strands, wherein said second and fourth metallic filaments are wrapped around the first and third metallic filaments with pitches $p_1$ and $p_2$, respectively, which satisfy, with respect to the pitch P of the cord, the relations $0.922 \leq p_1/P \leq 0.991$ and $0.922 \leq p_2/P \leq 0.991$.

15. The rubber product-reinforcing metallic cord of claim 12, which is twisted with a twist angle α in a range of 3.5 to 7.3 degrees.

16. A method of manufacturing a rubber product-reinforcing metallic cord of claim 12, comprising passing said first and third metallic filaments through the centers of pass lines, helically wrapping said second and fourth metallic filaments around said first and third metallic filaments with first and second flyers to form said first and second pre-strands, respectively, introducing said first and second pre-strands and said fifth metallic filament into a twister, and twisting said first and second pre-strands and said fifth metallic filament together with the pitch P.

* * * * *